United States Patent [19]

Ryan

[11] 4,310,252

[45] Jan. 12, 1982

[54] CATTLE FEEDING DEVICE

[75] Inventor: Kelly P. Ryan, Blair, Nebr.

[73] Assignee: Blair Manufacturing Company, Blair, Nebr.

[21] Appl. No.: 175,882

[22] Filed: Aug. 6, 1980

[51] Int. Cl.³ .............................................. B10F 7/08
[52] U.S. Cl. .................................. 366/186; 366/193; 366/299; 366/300; 366/603
[58] Field of Search ............... 366/603, 186, 193, 292, 366/297, 299, 300

[56] References Cited

U.S. PATENT DOCUMENTS

| | | | |
|---|---|---|---|
| 2,947,524 | 8/1960 | Bridges | 366/300 |
| 2,953,360 | 9/1960 | Kline | 366/297 X |
| 3,273,734 | 9/1966 | Schuler | 366/186 |
| 3,345,042 | 10/1967 | Ryan | 366/186 X |
| 3,421,740 | 1/1969 | Behrens | 366/186 |
| 3,688,827 | 9/1972 | Ryan | 366/297 X |
| 3,706,442 | 12/1972 | Peat | 366/603 X |
| 3,797,807 | 3/1974 | Behrens | 366/186 |
| 3,942,768 | 3/1976 | Hughes | 366/297 |
| 3,995,836 | 12/1976 | Carter | 366/603 X |

FOREIGN PATENT DOCUMENTS 2028151  3/1980  United Kingdom ............... 366/603

Primary Examiner—Billy J. Wilhite
Attorney, Agent, or Firm—Wegner, Stellman, McCord, Wood and Dalton

[57] ABSTRACT

The invention relates to a cattle feeding device in the form of a movable container provided with a plurality of augers, some extending horizontally and some inclined in order to effect proper mixing of feed introduced into the container together with means for discharging the thoroughly mixed feed for consumption by cattle.

4 Claims, 5 Drawing Figures

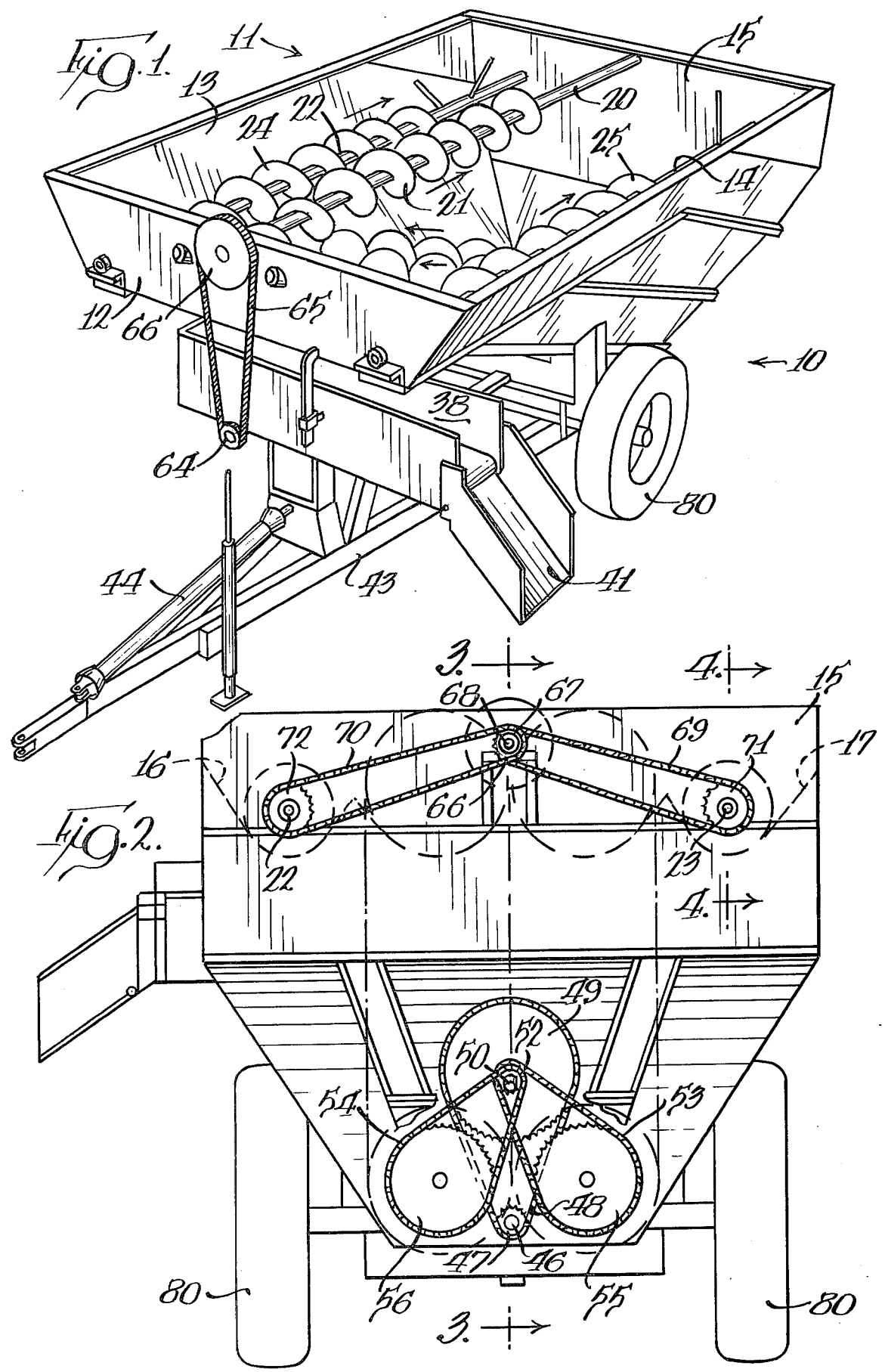

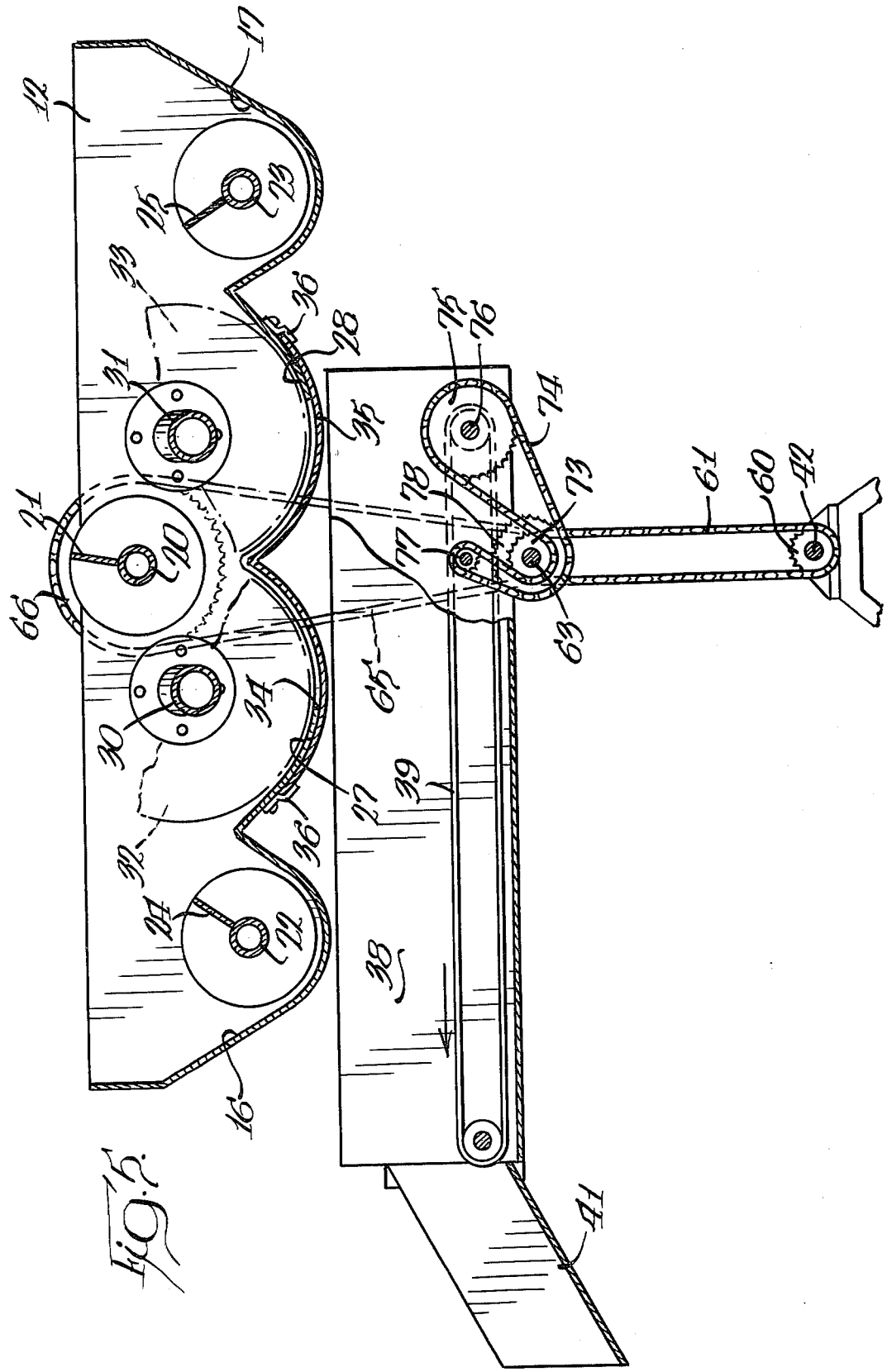

CATTLE FEEDING DEVICE

BACKGROUND OF THE INVENTION

Under present practices beef cattle which are to be slaughtered for human consumption are usually kept in a feedlot for some time prior to slaughter in order to improve the quality of the meat to be finally sold to the public. In the feedlot the cattle are fed a carefully controlled diet including corn, dried alfalfa, and alfalfa and molasses mixture, vitamins, and often antibiotics. As large numbers of cattle are to be fed, it is common to introduce the feed into a feed wagon which then moves about the feedlot distributing the feed into feed bins available to the cattle. Feed wagons usable for this purpose are shown in my early U.S. Pat. Nos. 3,345,042 and 3,688,827. As disclosed in those patents, the feed is normally dumped into the containers in sequence, viz, alfalfa, followed by corn, followed by alfalfa and molasses mixture, etc., and thus it is initially in layers in the feed container. It is of course necessary that the ingredients of the feed be carefully and thoroughly mixed before being dispensed for consumption by the cattle, and thus means are normally provided in such feed wagons or containers to effect such mixing.

In many cases, the mixers utilized to thoroughly mix the feed in a feed wagon container require substantial power for operation and thus they must be connected to a power takeoff of a tractor of substantial horsepower in order properly to operate. With the mixing devices of the present invention, it has been found that the horsepower requirements can be substantially reduced while still producing a thorough and in some cases improved mixture of the feed ingredients.

SUMMARY OF THE INVENTION

The present invention contemplates the use of a generally rectangular container mounted on wheels and adapted to be pulled by a tractor. Within the container is a plurality of horizontally extending augers and a plurality of inclined augers spaced just above the inclined bottom of the container. A drive system is provided which is adapted to be connected to the power takeoff of the tractor for operating the augers, the operation of which results in the thorough mixing of the feed in the container. A controllable gate is provided and may be opened when the mixing has been accomplished to discharge the mixed feed when desired.

BRIEF DESCRIPTION OF THE DRAWINGS

FIG. 1 is a top elevational view of a wheel-mounted container embodying the invention;

FIG. 2 is a rear end view of the apparatus shown in FIG. 1;

FIG. 3 is a vertical sectional view along line 3—3 of FIG. 2;

FIG. 4 is a view partially in vertical section illustrating the construction along each side of the container; and FIG. 5 is a sectional view along line 5—5 of FIG. 3.

DESCRIPTION OF THE PREFERRED EMBODIMENT

Referring now to the drawings, there is shown the cattle feed mixing and discharging apparatus 10 of the present invention, the apparatus including a generally rectangular open-top container 11 having a front wall 12 and side walls 13 and 14 together with a rear wall 15. Each of the side walls has a concave upwardly facing area 16 and 17 extending from the front wall 12 toward but terminating short of the rear wall 15.

Means are provided for thoroughly mixing the feed introduced into the container, the means being in the form of a plurality of augers including a first auger 20 extending horizontally from the front wall to the rear wall and having flights 21 extending from the front wall toward but terminating short of the rear wall. A pair of augers 22 and 23 extend parallel to each other and to the first auger and are located in a horizontal plane below the first auger. The second and third augers have flights 24 and 25 with the flights being located in the concave upwardly facing areas 16 and 17 respectively, with the flights 24 and 25 extending from the front wall of the container toward the rear wall but terminating short thereof.

The container has a bottom wall 26 having two scalloped or arcuate recesses 27 and 28 extending upwardly along the bottom from the rear wall to the front wall. A pair of inclined augers 30 and 31 extend parallel to each other with each having one end mounted in the front wall and extending downwardly from the front wall to the rear wall. The augers 30 and 31 have flights 32 and 33 thereon which extend from end to end of the augers with the flights being positioned to be received in said recesses 27 and 28 respectively.

A discharge chute 34 is located at the upper end of said recesses with the chute being controlled by a movable gate 35 mounted on the outside of the bottom wall and slidably carried by S-clamps 36. A piston and cylinder device 37 is secured to the bottom wall and to the gate for operating the latter. A discharge conveyor 38 is located beneath the chute 34 and includes an endless belt 39 carried by rollers 40. The discharge conveyor extends in a direction parallel to the front wall of the container and has a discharge trough 41 which extends beyond the container as shown in FIG. 1.

Means are provided for driving the various augers so far described from the power takeoff of a tractor or any other source of power. The drive means includes a drive shaft 42 rotatably mounted on frame member 43 and connected to a drive connector 44 adapted to be secured to the power takeoff of a tractor. The opposite end of the drive shaft 42 is connected by a U-joint 45 to a rotatable shaft 46 extending through the rear wall. A sprocket 47 is mounted on the shaft 46 and drives a chain 48 passing over a large sprocket 49 fixed to shaft 50 rotatably carried by the rear wall. The shaft 50 extends from the exterior of the rear wall to the interior thereof and carries a propeller-agitator 51 in the container to assist in the mixing action.

A pair of small sprockets 52 are mounted on the shaft 50 each of which carries a chain 53 and 54 led over a pair of larger sprockets 55 and 56 secured to the auger shafts 30 and 31 to drive the same. Drive shaft 42 also carries a sprocket 60 near its forward end over which a chain 61 passes to another sprocket 62 mounted on shaft 63. Another sprocket 64 is mounted on the outer end of shaft 63 and carries a chain 65 to a sprocket 66 on the end of auger shaft 20. The opposite end of auger shaft 20 which is rotatably mounted in the rear wall carries a pair of sprockets 67 and 68, drive chains 69 and 70 passing over sprockets 71 and 72 mounted on the outer end of the shafts of augers 23 and 22 respectively.

To drive the discharge conveyor, shaft 63 carries a sprocket 73 driving a chain 74 around drive sprocket 75 mounted on shaft 76 secured to rollers 40 with the chain 74 passing over an idler sprocket 77 and a second idler sprocket 78, each freely rotatable so that the shaft 76 rotates in a direction opposite to the direction of rotation of shaft 63.

The frame 43 which may be of any suitable construction sufficient to carry the container 11 and attendant apparatus is mounted for ground traversing movement on wheels 80 so that it may be easily towed by a tractor.

I claim:

1. A cattle feed mixing and discharging apparatus comprising a generally rectangular container having a front wall, a rear wall, two side walls, and a bottom wall slanting downwardly from the front wall to the rear wall, means mounting said container for ground traversing movement, a plurality of augers rotatably mounted in the container including a first auger extending horizontally from approximately the center of the front wall to the center of the rear wall and having flights terminating short of the rear wall, a second and a third auger extending from the front wall to the rear wall parallel to each other and on either side of the first auger, said second and third augers lying in a plane extending horizontally below the first auger, said second and third augers having flights terminating short of the rear wall, each of the side walls having near its top a concave upwardly facing area extending from the front wall and toward but terminating short of the rear wall with the second and third augers being located in said areas, a fourth and a fifth auger extending downwardly from the front wall to the rear wall and closely adjacent the bottom wall, said bottom wall having a pair of spaced parallel arcuate recesses extending substantially the entire length of the bottom wall and receiving said fourth and fifth augers, a discharge chute in the recesses near the juncture of the bottom wall and the front wall, a gate controlling the chute, a discharge conveyor positioned beneath the discharge opening and extending parallel to and beyond the front wall, a propeller-agitator rotatably mounted on the rear wall in the lower region of the container, drive means for rotating the propeller-agitator and for rotating the augers in a direction whereby the first, second, and third augers mix and move feed in the container toward the rear wall, and the fourth and fifth augers mix and move feed from the lower portion of the rear wall upwardly toward the front wall, and means for operating the gate to open the chute to cause mixed feed to be discharged onto the discharge conveyor.

2. A cattle feed mixing and discharging apparatus comprising a generally rectangular container having a front wall, a rear wall, two side walls, and a bottom wall slanting downwardly from the front wall to the rear wall, means mounting said container for ground traversing movement, a plurality of augers rotatably mounted in the container including a first auger extending horizontally from approximately the center of the front wall to the center of the rear wall and having flights terminating short of the rear wall, a second and a third auger extending from the front wall to the rear wall parallel to each other and on either side of the first auger, said second and third augers lying in a plane extending horizontally below the first auger, said second and third augers having flights terminating short of the rear wall, each of the side walls having near its top a concave upwardly facing area extending from the front wall and toward but terminating short of the rear wall with the second and third augers being located in said areas, a fourth and a fifth auger extending downwardly from the front wall to the rear wall and closely adjacent the bottom wall, said bottom wall having a pair of spaced parallel arcuate recesses receiving said fourth and fifth augers, a discharge chute in the recesses near the juncture of the bottom wall and the front wall, a gate controlling the chute, a discharge conveyor positioned beneath the discharge opening and extending parallel to and beyond the front wall, a propeller-agitator rotatably mounted on the rear wall in the lower region of the container, drive means for rotating the propeller-agitator and for rotating the augers in a direction whereby the first, second, and third augers mix and move feed in the container toward the rear wall, and the fourth and fifth augers mix and move feed from the lower portion of the rear wall upwardly toward the front wall, and means operable independent of the rotation of the augers for operating the gate to open the chute, whereby said augers may be driven to thoroughly mix the feed before the chute is opened to discharge the feed onto the discharge conveyor.

3. A cattle feed mixing and discharging apparatus comprising a generally rectangular container having a front wall, a rear wall, two side walls, and a bottom wall slanting downwardly from the front wall to the rear wall, means mounting said container for ground traversing movement, a plurality of augers rotatably mounted in the container including a first auger extending horizontally from approximately the center of the front wall to the center of the rear wall, a second and a third auger extending from the front wall to the rear wall parallel to each other and on either side of the first auger, said second and third augers lying in a plane extending horizontally below the first auger, each of the side walls having near its top a concave upwardly facing area extending from the front wall and toward but terminating short of the rear wall with the second and third augers being located in said areas, a fourth and a fifth auger extending downwardly from the front wall to the rear wall and closely adjacent the bottom wall, said bottom wall having a pair of spaced parallel arcuate recesses receiving said fourth and fifth augers, a discharge chute in the recesses near the juncture of the bottom wall and the front wall, a gate controlling the chute, a discharge conveyor positioned beneath the discharge opening and extending parallel to and beyond the front wall, drive means for rotating the augers in a direction whereby the first, second, and third augers mix and move feed in the container toward the rear wall, and the fourth and fifth augers mix and move feed from the lower portion of the rear wall upwardly toward the front wall, and means for operating the gate to open the chute to cause mixed feed to be discharged onto the discharge conveyor.

4. A cattle feed mixing and discharging apparatus comprising a generally rectangular container having a front wall, a rear wall, two side walls, and a bottom wall slanting downwardly from the front wall to the rear wall, means mounting said container for ground traversing movement, a plurality of augers rotatably mounted in the container including a first plurality of augers extending horizontally from the front wall to the rear wall, a second plurality of augers extending downwardly from the front wall to the rear wall and closely adjacent the bottom wall, a discharge chute near the juncture of the bottom wall and the front wall, a gate controlling the chute, a discharge conveyor positioned beneath the discharge opening and extending parallel to and beyond the front wall, drive means for rotating the augers in a direction whereby the first plurality of augers mix and move feed in the container from the front wall toward the rear wall, and the second plurality of augers mix and move feed from the lower portion of the rear wall upwardly toward the front wall, and means for operating the gate to open the chute to cause mixed feed to be discharged onto the discharge conveyor.

* * * * *